Patented Aug. 1, 1933

1,920,523

UNITED STATES PATENT OFFICE 1,920,523

OLEAGINOUS SOLUTION OF MERCURY COMPOUNDS AND METHOD OF PREPARING THE SAME

George W. Raiziss, Philadelphia, Pa., assignor to Abbott Laboratories, North Chicago, Ill., a Corporation of Illinois No Drawing. Application January 8, 1930.
Serial No. 419,466

9 Claims. (Cl. 167—71)

My invention relates to compositions of matter which are especially suitable for use as pharmaceuticals, particularly in the treatment of infectious diseases, and has to do more particularly with oil and fat solutions of mercury compounds and to processes of preparing such solutions.

I have made the unexpected discovery that bactericidal and germicidal compounds, both organic and inorganic, and particularly organic compounds of mercury, may be conveniently dissolved in oils and fats, both of animal and vegetable origin, and that such solutions have remarkably increased curative properties over the corresponding aqueous solutions in the treatment of various infections in the human organism, and that, furthermore, such solutions may be administered with much more comfort to the patient than the aqueous solutions of the same compounds. My discovery has enabled me to prepare oleaginous solutions of compounds which are ordinarily considered insoluble in oil.

These oleaginous solutions are useful in surgery, ophthalmology, otology, laryngology, rhinology and the diseases of the genito-urinary system, and are especially valuable in the treatment of acute and chronic gonorrheal urethritis.

An object of my invention, therefore, is to produce new and useful pharmaceutical preparations comprising oleaginous solutions of compounds such as are described above.

Another object is to provide a convenient method for the preparation of such solutions.

A still further object is to provide as a new composition of matter and pharmaceutical, a chloro-mercuri derivative of 4-nitro-ortho-cresol, which is also soluble in oils.

I have found particularly that mercuri derivatives of certain organic and inorganic mercury compounds which are soluble in one of the usual organic solvents, such as acetone, chloroform, alcohol or ether, can also be dissolved in vegetable and animal oils and fats.

My preferred procedure for preparing oleaginous solutions of organic and inorganic mercury compounds is as follows:

The mercury compound is first dissolved preferably in a suitable organic solvent, such as one of those noted above. To this solution is added an oil or fat which is miscible with the organic solvent used, mixed thoroughly, and the organic solvent is then distilled off. The mercurial compound remains in solution in the oil or fat.

In this manner I have prepared oleaginous solutions of a number of organic and inorganic compounds. The vegetable oils used by me in this connection include olive, almond, cotton seed, castor oil, and cocoa butter. Included among the animal oils and fats which I have used are lanoline, lard oil, and cod liver oil.

The following preferred examples are given as illustrative of my invention:

EXAMPLE I

Organic halogen mercurials (a) As an example of an organic halogen mercurial to which my invention is applicable, I may mention a chloro-mercuri derivative of 4-nitro-ortho-cresol, which, itself, is a new product discovered by me and forms the subject matter of a co-pending application, Serial No. 442,460, filed April 7, 1930, and which is prepared as follows:

A mercury compound of 4-nitro-ortho-cresol is first prepared in accordance with my Patent No. 1,554,293, granted September 22, 1925, and forming the subject matter of my Reissue Patent No. 17,563, granted January 14, 1930. This process, briefly summarized, comprises the preparation of 4-nitro-ortho-toluidine, which is diazotized to form 4-nitro-ortho-cresol. This product is converted into the desired mercury compound by the addition of hot acidified aqueous solution of mercuric acetate, the mercury compound being precipitated by means of an alkali and separated from indazol derivatives by extracting the precipitate with hot alkali solution and acidifying the extracts with acetic acid. The resulting precipitate represents the desired mercuri derivative of 4-nitro-ortho-cresol.

About 80 grams of this mercury product are dissolved in 4 liters of boiling distilled water, with the aid of 55 cc. of 40% sodium hydroxide solution. After cooling the clear solution, the chloro derivative is precipitated by the addition of hydrochloric acid, using Congo red test paper.

(b) Eighty-eight grams of a mercury derivative of 4-nitro-ortho-cresol such as that described in my Patent No. 1,554,293, granted September 22, 1925, and in my patent noted above, are dissolved in 4 liters of boiling distilled water, with the aid of 55 cc. of 40 per cent. sodium hydroxide solution.

After cooling the clear solution, the chloro derivative is precipitated by the addition of hydrochloric acid, using Congo red test paper.

The precipitate is filtered, washed with distilled water until free from chlorides, and dried.

Twenty grams of this or the above chloro derivative are dissolved in 1.6 liters of absolute ether and 2 liters of high-grade purified olive oil are added and mixed thoroughly. After the ether is driven off by distillation the mercury compound remains dissolved in the oil.

In precisely the same manner are prepared halide-mercuri derivatives and corresponding oleaginous solutions of mercuri-6-nitro-3-cresol, mercuri-4-nitro-3-cresol and other organic mercury compounds of nitro cresol.

EXAMPLE II

*Organic non-halogen mercurials*

Twenty grams of acetoxy-mercuri-4-nitro-2-cresol are dissolved in 5 liters of acetone to which has been added 10 cc. of glacial acetic acid.

To the clear solution are added 10 liters of high-grade purified olive oil, mixed thoroughly and filtered if necessary.

The acetone is driven off by distillation in vacuo, the last traces of it being removed by passing air through the solution which is warmed to 50° C.

It will be readily understood that various other oils and fats may be substituted for the olive oil mentioned in the above examples, and that various other organic mercury compounds may be substituted for the compounds specified. Various other variations and modifications of the procedure will readily occur to those skilled in the art. Hence, I do not wish to be limited in any sense by the particular embodiments of my invention disclosed above, but my invention is to be limited solely by the appended claims interpreted in as broad a scope as is consistent with the state of the art.

I claim as my invention:

1. As a new composition of matter, an oleaginous solution of an organic mercuri-halide compound, which is suitable for the treatment of infections in the human organism.

2. A method of preparing an oleaginous solution containing the active nucleus of an organic mercury compound useful in the treatment of infectious diseases of the human organism, said compound being itself insoluble in oleaginous materials, comprising transforming said compound into a halide mercuri derivative, dissolving said derivative in a volatile organic solvent, admixing an oleaginous substance therewith, and distilling off said solvent.

3. A method as defined in claim 2 in which the oleaginous substance is olive oil.

4. As a new pharmaceutical, an oleaginous solution of an organic mercurial normally practically insoluble in oils and fats, said mercurial being present in the form of its chloro derivative.

5. As a new composition of matter especially useful as a pharmaceutical, an oleaginous solution of a halide-mercuri derivative of a nitro-cresol.

6. As a new composition of matter especially useful as a pharmaceutical, an oleaginous solution of a chloro-mercuri derivative of 4-nitro-ortho-cresol.

7. As a new pharmaceutical, an oleaginous solution of an organic mercurial normally practically insoluble in oils and fats, said mercurial being present in the form of its halide derivative.

8. A composition as defined in claim 5, wherein olive oil is the liquid vehicle.

9. A composition as defined in claim 6, wherein olive oil is the liquid vehicle.

GEORGE W. RAIZISS.